United States Patent
Lin et al.

(10) Patent No.: US 8,933,678 B2
(45) Date of Patent: Jan. 13, 2015

(54) BUCK VOLATGE CONVERTING APPARATUS

(71) Applicant: Excelliance MOS Corporation, Hsinchu County (TW)

(72) Inventors: Pao-Chuan Lin, Hsinchu County (TW); Su-Yuan Lin, Hsinchu County (TW); Hung-Che Chou, Hsinchu County (TW)

(73) Assignee: Excelliance MOS Corporation, Hsinchu County (TW)

( * ) Notice: Subject to any disclaimer, the term of this patent is extended or adjusted under 35 U.S.C. 154(b) by 242 days.

(21) Appl. No.: 13/723,206

(22) Filed: Dec. 21, 2012

(65) Prior Publication Data

US 2014/0176104 A1 Jun. 26, 2014

(51) Int. Cl.
*H02M 3/158* (2006.01)
*H02M 3/156* (2006.01)
*H02M 1/32* (2007.01)

(52) U.S. Cl.
CPC ............... *H02M 3/156* (2013.01); *H02M 1/32* (2013.01); *H02M 3/1588* (2013.01); *H02M 2003/1566* (2013.01)

USPC .......................... 323/282; 323/223; 323/284

(58) Field of Classification Search
CPC .................................................. H02M 3/1588
USPC .......................... 323/282, 223, 225, 230, 284
See application file for complete search history.

(56) References Cited

U.S. PATENT DOCUMENTS 6,873,191 B2 * 3/2005 Dequina et al. ............... 327/110

\* cited by examiner

*Primary Examiner* — Harry Behm
(74) *Attorney, Agent, or Firm* — Jianq Chyun IP Office

(57) ABSTRACT

A buck voltage converting apparatus is disclosed. The buck voltage converting apparatus includes a first transistor, a second transistor, an inductor, a controller and a switch. The first transistor receives an input voltage. A first terminal of the inductor is coupled to the first and second transistors. A second terminal of the inductor is coupled to an output terminal of the buck voltage converting apparatus for generating an output voltage. The controller receives the output voltage, and generates a detection voltage according to voltage amplitude of the output voltage. The switch is coupled between a first terminal of the first transistor and a control terminal of the second transistor. The switch is turned on or off according to the detection voltage.

9 Claims, 3 Drawing Sheets

200

BUCK VOLATGE CONVERTING APPARATUS

TECHNICAL FIELD

The disclosure relates to a buck voltage converting apparatus, and particularly relates to a buck voltage converting apparatus that reduces overshoot of the output voltage of the buck voltage converting apparatus that may occur.

BACKGROUND

Referring to FIGS. 1A and 1B, FIG. 1A is a circuit diagram illustrating a conventional buck voltage converting apparatus 100, and FIG. 1B illustrates waveforms of the signals of the buck voltage converting apparatus 100. The buck voltage converting apparatus 100 includes transistors Q1 and Q2, an inductor L1 and a capacitor C1. The transistors Q1 and Q2 are alternately turned on or off based on complementary control signals UGATE and LGATE which are respectively received by the transistors Q1 and Q2, and an input voltage is converted via the inductor L1 to generate an output voltage VOUT, wherein the output voltage VOUT is used to drive a load RL.

Referring to FIG. 1B, at a time point T1, a current IRL required by the load RL drops rapidly (the load RL is changed from heavy load to light load), and a dropping rate of a current IL1 stored in the inductor L1 does not keep up with the change of the load RL. Meanwhile, a power storage in the capacitor C1 is charged rapidly by receiving the current IL1 on the inductor L1, and an overshoot on the output voltage VOUT is generated for a rapid increase of the output voltage VOUT. The overshoot of the output voltage VOUT may damage circuit devices on the buck voltage converting apparatus 100 and/or the load RL and influence operations of related products.

SUMMARY

The disclosure provides a buck voltage converting apparatus effectively reducing an overshoot of the output voltage of the buck voltage converting apparatus that may occur.

The disclosure provides a buck voltage converting apparatus, including a first transistor, a second transistor, an inductor, a controller, and a switch. The first transistor has a first terminal, a second terminal, and a control terminal, wherein the first terminal of the first transistor receives an input voltage, and the control terminal of the first transistor receives a first control signal. The second transistor has a first terminal, a second terminal, and a control terminal, wherein the second terminal of the first transistor is coupled to the first terminal of the second transistor, the second terminal of the second transistor is coupled to a reference ground voltage, and the control terminal of the second transistor receives a second control signal. A first terminal of the inductor is coupled to the second terminal of the first transistor and a second terminal of the inductor is coupled to an output terminal of the buck voltage converting apparatus to generate an output voltage. The controller receives the output voltage and detects a value of the output voltage to generate a detection voltage. The switch is connected in series between the second terminal of the first transistor and the control terminal of the second transistor, wherein the switch is turned on or off based on the detection voltage.

In an embodiment of the disclosure, the controller detects whether the output voltage exceeds a threshold voltage to generate the detection voltage.

In an embodiment of the disclosure, the controller includes a comparator. The comparator is coupled to the output terminal of the buck voltage converting apparatus and compares the output voltage and the threshold voltage to generate the detection voltage.

In an embodiment of the disclosure, when the switch is turned on based on the detection voltage, a path for the second control signal to be provided to the control terminal of the second transistor is cut off.

In an embodiment of the disclosure, the first transistor is turned off according to the first control signal.

In an embodiment of the disclosure, the control terminal of the second transistor is coupled to the first terminal of the second transistor via the switch that is turned on, and the second transistor is turned off based on a voltage on the first terminal of the second transistor.

In an embodiment of the disclosure, a capacitor is further included. The capacitor is connected in series between the output terminal of the buck voltage converting apparatus and the reference ground voltage.

In an embodiment of the disclosure, a control signal generator is further included. The control signal generator is coupled to the control terminals of the first and second transistors and respectively provides the first and second control signals to the control terminals of the first and second transistors.

In an embodiment of the disclosure, when the switch is turned on based on the detection voltage, the control signal generator stops providing the second control signal to the control terminal of the second transistor.

In view of the foregoing, the disclosure detects the voltage value of the output voltage when the buck voltage converting apparatus changes from heavy load to light load, so as to turn on the switch connected in series between the first terminal and the control terminal of the second transistor. In addition, the second transistor is turned off via the switch, so as to provide a current loop between a diode formed by the reference ground voltage and a substrate of the second transistor and the inductor to rapidly consume power of the inductor, thereby reducing amplitude of overshoot of the output voltage that may occur.

In order to make the aforementioned and other features and advantages of the present invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
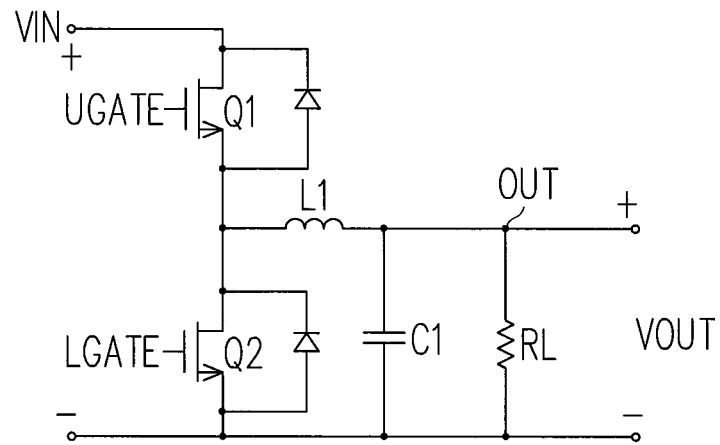
FIG. 1A is a circuit diagram illustrating a conventional buck voltage converting apparatus 100.
Figure 1B:
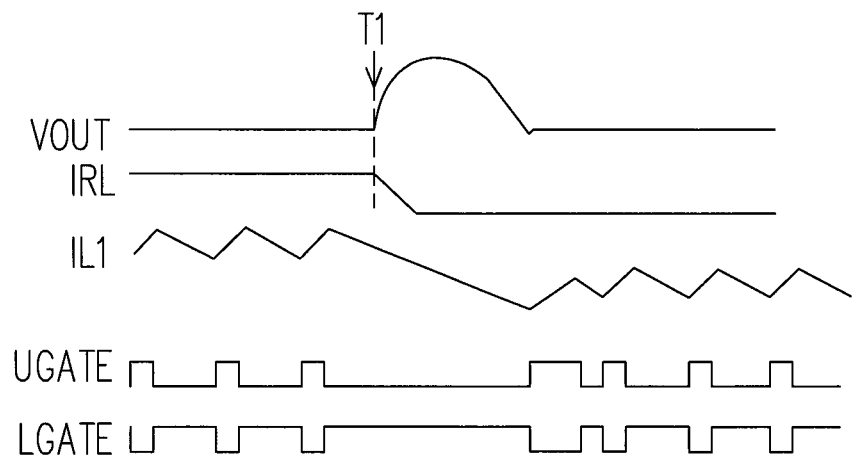
FIG. 1B illustrates waveforms of the signals while the buck voltage converting apparatus 100 operates.
Figure 2A:
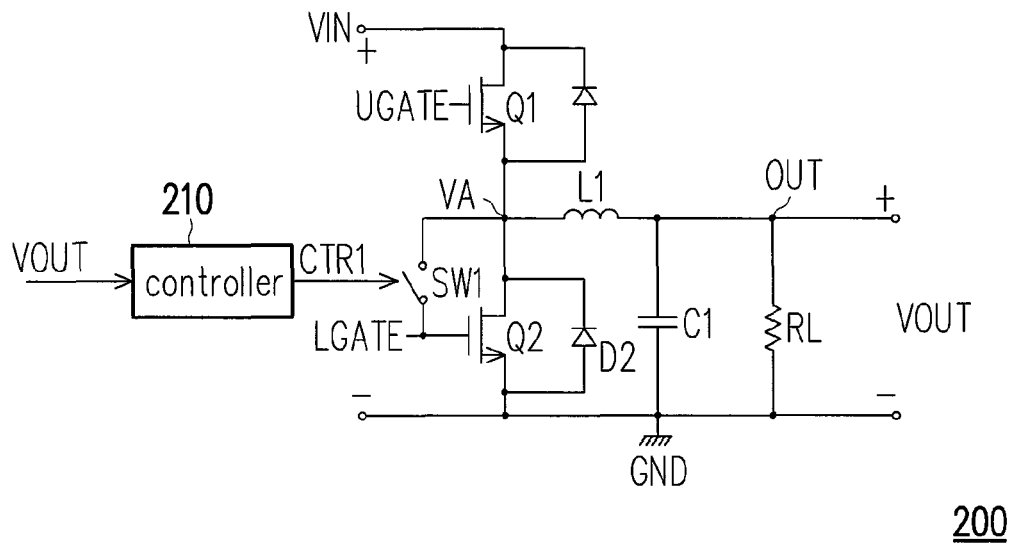
FIG. 2A is a schematic diagram illustrating a buck voltage converting apparatus 200 according to an embodiment of the disclosure.

Referring to FIG. 2A, FIG. 2A is a schematic diagram illustrating a buck voltage converting apparatus 200 according to an embodiment of the disclosure. The buck voltage converting apparatus 200 includes transistors Q1 and Q2, an inductor L1, a controller 210, a switch SW1 and a capacitor C1. The transistor Q1 has a first terminal (e.g. source), a second terminal (e.g. drain), and a control terminal (e.g. gate). The first terminal of the transistor Q1 receives an input voltage VIN, the control terminal of the transistor Q1 receives a control signal UGATE, and the second terminal of the transistor Q1 is coupled to a first terminal of the transistor Q2 (e.g. source). In addition, a second terminal of the transistor Q2 is coupled to a reference ground voltage GND, whereas a control terminal of the transistor Q2 receives a control signal LGATE. In this embodiment, the transistors Q1 and Q2 are respectively turned on or off according to the control signals UGATE and LGATE that are received, wherein the transistors Q1 and Q2 are not turned on at the same time.

A first terminal of the inductor L1 is coupled to the second terminal of the transistor Q1 and the first terminal of the transistor Q2, a second terminal of the inductor L1 is coupled to an output terminal of the buck voltage converting apparatus 200. The output terminal OUT of the buck voltage converting apparatus 200 generates an output voltage VOUT to drive a load RL.

A first terminal of the switch SW1 is coupled to a mutual coupling terminal (i.e. the first terminal of the inductor L1) of the inductor L1 and the transistors Q1 and Q2, and a second terminal of the switch SW1 is coupled to the control terminal of the transistor Q2. The switch SW1 is turned on or off under control of a detection signal CTR1. The detection signal CTR1 is generated by the controller 210 coupled to the switch SW1. In addition, the controller 210 is coupled to the output terminal OUT of the buck voltage converting apparatus 200 and receives the output voltage VOUT. In this embodiment, the controller 210 generates the detection voltage CTR1 by detecting a value of the output voltage VOUT.

The capacitor C1 is connected in series between the output terminal OUT and the reference ground voltage GND.

Figure 2B:
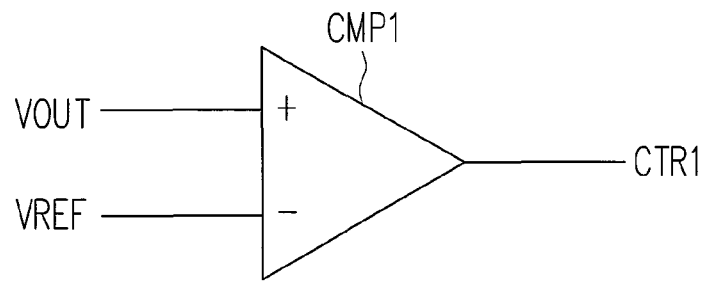
FIG. 2B is a schematic diagram illustrating an embodiment of a controller 210 according to an embodiment of the disclosure.
Figure 2C:
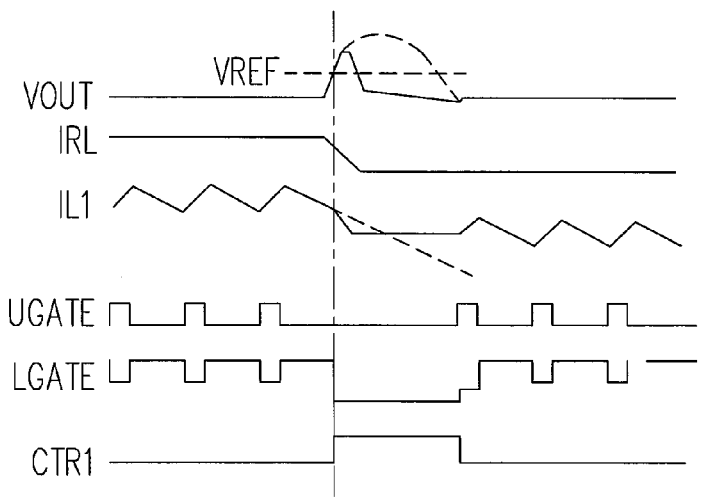
FIG. 2C illustrates waveforms of the signals while the buck voltage converting apparatus 200 in the embodiment of FIG. 2A operates.

With respect to the overall operation, referring to FIGS. 2A and 2C simultaneously, FIG. 2C illustrates waveforms of the signals of the buck voltage converting apparatus 200 in the embodiment of FIG. 2A. When a current IRL required by the load RL drops rapidly, the output voltage VOUT correspondingly increases rapidly and exceeds a threshold voltage VREF. By instantly detecting the value of the output voltage VOUT, the controller 210 correspondingly generates the detection voltage CTR1 to turn on the switch SW1, and the controller 210 generates the detection voltage CTR1 at a logic high-level, for example, when the output voltage VOUT exceeds the threshold voltage CTR1.

Referring to FIG. 2B herein, FIG. 2B is a schematic diagram illustrating an embodiment of a controller 210 according to an embodiment of the disclosure. The controller 210 includes a comparator CMP1. The comparator CMP1 receives the output voltage VOUT and the threshold voltage VREF, and generates the detection voltage CTR1 by comparing the output voltage VOUT and the threshold voltage VREF. The threshold voltage VREF is a preset value that may be configured by the designer according to an operating condition of the buck voltage converting apparatus 200 in practice.

In addition, the comparator CMP1 may not directly receive the output voltage VOUT for the comparing operation. A resistor string (not shown) may be configured in the controller 210 to divide the output voltage VOUT. An result of voltage division is then transmitted to the comparator CMP1 to be compared with the preset threshold voltage VREF, so as to generate the detection voltage CTR1. Thereby, the comparator CMP1 may not directly take the output voltage VOUT with a higher voltage level, so a number of required high voltage devices is reduced, and a circuit size is reduced as well.

Referring to FIGS. 2A and 2C again, when the switch SW1 makes reference to the detection voltage CTR1, the control signal LGATE is stopped from being provided to the control terminal of the transistor Q2. In brief, in this embodiment of the disclosure, a path for the control signal LGATE to be provided to the control terminal of the transistor Q2 may be cut off, such that the control terminal of the transistor Q2 alternatively receives a voltage VA on the second terminal of the transistor Q1 (the first terminal of the inductor L1) via the switch SW1.

Since the transistor Q1 is turned off according to the control signal UGATE, the voltage VA on the second terminal of the transistor Q1 correspondingly drops, such that the transistor Q2 is also correspondingly turned off. Meanwhile, a current loop is generated between a parasitic diode D2 formed by the transistor Q2 and the inductor L1, facilitating a current consumption rate in the inductor L1 and effectively reducing a voltage amplitude wherein overshoot of the output voltage VOUT may occur.

Figure 3:
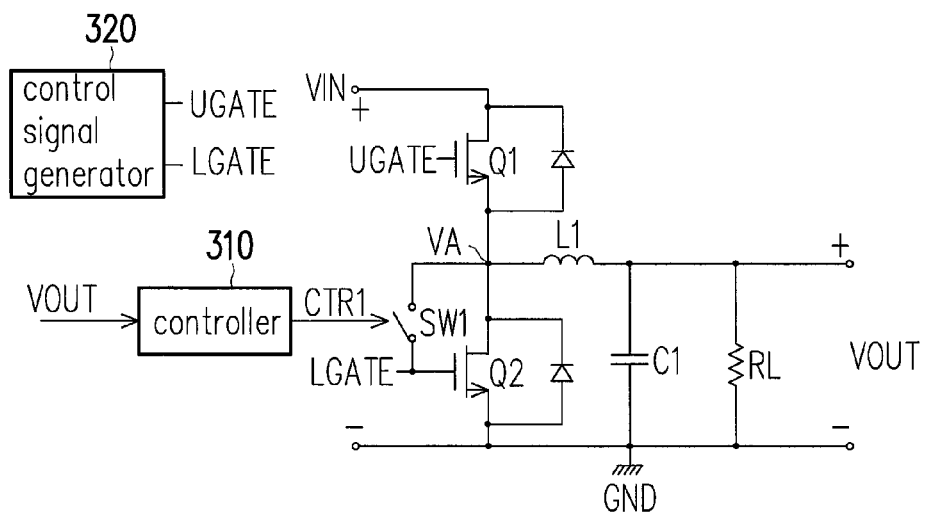
FIG. 3 is a schematic diagram illustrating a buck voltage converting apparatus 300 according to another embodiment of the disclosure.

Referring to FIG. 3, FIG. 3 is a schematic diagram illustrating a buck voltage converting apparatus 300 according to another embodiment of the disclosure. The buck voltage converting apparatus 300 includes the transistors Q1 and Q2, the inductor L1, a controller 310, a control signal generator 320, the switch SW1 and the capacitor C1, wherein the control signal generator 320 is adapted for generating the control signals UGATE and LGATE to respectively control whether the transistors Q1 and Q2 are turned on or off, wherein the control signals UGATE and LGATE are pulse width modulation (PWM) signals. In addition, when the controller 310 provides the detection voltage CTR1 to turn on the switch SW1, the control signal generator 320 stops providing the control signal LGATE to the control terminal of the transistor Q2 (e.g. a circumstance in which an endpoint that the control signal generator 320 generates the detection voltage CTR1 is changed into a floated state).

It should be noted that the controller 310 and the control signal generator 320 in this embodiment may be integrated into a single circuit.

Details of operations of the buck voltage converting apparatus 300 are identical to the buck voltage converting apparatus 200 illustrated in FIG. 2A, so the details are not reiterated hereinafter.

In view of the foregoing, the disclosure provides the switch connected in series between the control terminal and the first terminal of the second transistor of the buck voltage converting apparatus. When a state of load driven by the buck voltage converting apparatus is converted from heavy load to light load, the switch is timely turned on, so as to turn off the second transistor. A current loop is provided via the parasitic diode of the second transistor that is turned off, such that power in the inductor is consumed more rapidly, thereby reducing the overshoot amplitude of the output voltage generated by the buck voltage converting apparatus.

Although the invention has been described with reference to the embodiments thereof, it will be apparent to one of the ordinary skills in the art that modifications to the described embodiments may be made without departing from the spirit of the invention. Accordingly, the scope of the invention will be defined by the attached claims not by the above detailed description.

What is claimed is:

1. A buck voltage converting apparatus, comprising:
    a first transistor, having a first terminal, a second terminal, and a control terminal, wherein the first terminal of the first transistor receives an input voltage, and the control terminal of the first transistor receives a first control signal;
    a second transistor, having a first terminal, a second terminal, and a control terminal, wherein the second terminal of the first transistor is coupled to the first terminal of the second transistor, the second terminal of the second transistor is coupled to a reference ground voltage, and the control terminal of the second transistor receives a second control signal;
    an inductor, wherein a first terminal of the inductor is coupled to the second terminal of the first transistor and a second terminal of the inductor is coupled to an output terminal of the buck voltage converting apparatus to generate an output voltage;
    a controller, receiving the output voltage, detecting a value of the output voltage to generate a detection voltage; and
    a switch, connected in series between the second terminal of the first transistor and the control terminal of the second transistor, wherein the switch is turned on or off based on the detection voltage.

2. The buck voltage converting apparatus as claimed in claim 1, wherein the controller detects whether the output voltage exceeds a threshold voltage to generate the detection voltage.

3. The buck voltage converting apparatus as claimed in claim 2, wherein the controller comprises:
    a comparator, coupled to the output terminal of the buck voltage converting apparatus and comparing the output voltage and the threshold voltage to generate the detection voltage.

4. The buck voltage converting apparatus as claimed in claim 1, wherein when the switch is turned on based on the detection voltage, a path for the second control signal to be provided to the control terminal of the second transistor is cut off.

5. The buck voltage converting apparatus as claimed in claim 4, wherein the first transistor is turned off according to the first control signal.

6. The buck voltage converting apparatus as claimed in claim 4, wherein the control terminal of the second transistor is coupled to the first terminal of the second transistor via the switch that is turned on, and the second transistor is turned off based on a voltage on the first terminal of the second transistor.

7. The buck voltage converting apparatus as claimed in claim 1, further comprising:
    a capacitor, connected in series between the output terminal of the buck voltage converting apparatus and the reference ground voltage.

8. The buck voltage converting apparatus as claimed in claim 1, further comprising:
    a control signal generator, coupled to the control terminals of the first and second transistors, and respectively providing the first and second control signals to the control terminals of the first and second transistors.

9. The buck voltage converting apparatus as claimed in claim 8, wherein when the switch is turned on based on the detection voltage, the control signal generator stops providing the second control signal to the control terminal of the second transistor.

* * * * *